(12) United States Patent
Aikyo

(10) Patent No.: US 12,312,036 B2
(45) Date of Patent: May 27, 2025

(54) AIRBAG DEVICE

(71) Applicant: HONDA MOTOR CO., LTD., Tokyo (JP)

(72) Inventor: Yutaka Aikyo, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/729,737

(22) PCT Filed: Jan. 21, 2022

(86) PCT No.: PCT/JP2022/002279
§ 371 (c)(1),
(2) Date: Jul. 17, 2024

(87) PCT Pub. No.: WO2023/139768
PCT Pub. Date: Jul. 27, 2023

(65) Prior Publication Data
US 2025/0100643 A1 Mar. 27, 2025

(51) Int. Cl.
*B62J 27/20* (2020.01)
*B60R 21/00* (2006.01)
*B60R 21/0132* (2006.01)

(52) U.S. Cl.
CPC .......... *B62J 27/20* (2020.02); *B60R 21/0132* (2013.01); *B60R 2021/0006* (2013.01)

(58) Field of Classification Search
CPC .............. B62J 27/20; B60R 21/0132; B60R 2021/0006
USPC ...................................... 280/728.1
See application file for complete search history.

(56) References Cited

U.S. PATENT DOCUMENTS

| | | | | |
|---|---|---|---|---|
| 3,930,667 A | * | 1/1976 | Osuchowski | B60R 21/16 441/103 |
| 4,685,151 A | * | 8/1987 | Kincheloe | B62J 27/20 2/466 |
| 5,938,231 A | * | 8/1999 | Yamazaki | B62J 27/20 280/728.1 |
| 5,967,545 A | * | 10/1999 | Lijima | B62J 27/20 280/739 |

(Continued)

FOREIGN PATENT DOCUMENTS

| | | |
|---|---|---|
| JP | H10-6901 A | 1/1998 |
| JP | 2006-160171 A | 6/2006 |

(Continued)

OTHER PUBLICATIONS

International Search Report Corresponding to International Application No. PCT/JP2022/002279, dated Apr. 5, 2022, 4 pages.

(Continued)

*Primary Examiner* — Timothy Wilhelm
*Assistant Examiner* — Caitlin Anne Miller
(74) *Attorney, Agent, or Firm* — Rankin, Hill & Clark LLP

(57) ABSTRACT

An airbag device that is mounted on a vehicle and provided with an airbag that deploys around a rider includes: a separation unit that separates the airbag from the vehicle; a detection unit that detects an elapsed time since deployment of the airbag; and a separation control unit that causes the separation unit to separate the airbag in a case where a predetermined condition including a first condition that the elapsed time detected by the detection unit exceeds a time threshold is satisfied.

21 Claims, 11 Drawing Sheets

(56) References Cited

U.S. PATENT DOCUMENTS

| | | | | |
|---|---|---|---|---|
| 7,275,762 | B2* | 10/2007 | Miyata | B60R 21/16 |
| | | | | 280/743.1 |
| 7,401,364 | B2* | 7/2008 | Goto | B62J 27/20 |
| | | | | 2/102 |
| 11,866,112 | B2* | 1/2024 | Aikyo | B62J 27/20 |
| 12,128,978 | B2* | 10/2024 | Aikyo | A41D 13/0525 |
| 12,145,680 | B2* | 11/2024 | Aikyo | B62J 27/20 |
| 2006/0125206 | A1 | 6/2006 | Goto et al. | |
| 2009/0055053 | A1* | 2/2009 | Carmeli | B60R 21/0132 |
| | | | | 701/45 |
| 2023/0128268 | A1 | 4/2023 | Aikyo | |
| 2024/0123934 | A1* | 4/2024 | Ohno | B60R 21/23138 |

FOREIGN PATENT DOCUMENTS

| | | | |
|---|---|---|---|
| JP | 2008-183913 A | | 8/2008 |
| JP | 2015110368 A | * | 6/2015 |
| WO | 2021/199334 A1 | | 10/2021 |

OTHER PUBLICATIONS

Written Opinion of the International Searching Authority Corresponding to International Application No. PCT/JP2022/002279, dated Apr. 5, 2022, 3 pages.

English translation of the International Preliminary Report on Patentability issued Aug. 2, 2024 in corresponding International application No. PCT/JP2022/002279 (5 pages).

* cited by examiner

AIRBAG DEVICE

TECHNICAL FIELD

The present invention relates to an airbag device.

BACKGROUND ART

A saddle-ride vehicle equipped with an airbag device including an airbag that deploys around a rider has been proposed (for example, Patent Literature 1). Patent Literature 1 discloses a structure in which an airbag is supported by a slide frame, and in a case where impact is large at the time of collision, the slide frame slides forward and is separated from a guide rail, so that a rider is separated from a motorcycle while being restrained by the airbag.

CITATION LIST

Patent Literature

Patent Literature 1: JP 10-006901 A

SUMMARY OF INVENTION

Technical Problem

In the configuration of the related art, the impact is absorbed by the slide frame, but the speed (release speed) at which the rider is separated from the vehicle at the time of collision is not reduced by the airbag.

The present invention has been made in view of the above circumstances, and an object of the present invention is to facilitate the reduction of a release speed of a rider using an airbag.

Solution to Problem

An airbag device that is mounted on a vehicle and provided with an airbag that deploys around a rider includes: a separation unit that separates the airbag from the vehicle; and an airbag control unit that detects an elapsed time since deployment of the airbag and causes the separation unit to separate the airbag in a case where a predetermined condition including the elapse of a predetermined time is satisfied.

Advantageous Effects of Invention

A release speed of a rider is easily reduced using an airbag.

DESCRIPTION OF EMBODIMENTS

Hereinafter, embodiments of the present invention will be described with reference to the drawings. Note that, in the description, directions such as front, rear, left, right, up and down are identical to directions with respect to a vehicle body, unless otherwise specified. In addition, the reference sign FR in each drawing indicates a front side of the vehicle body, the reference sign UP indicates an upper side of the vehicle body, and the reference sign LH indicates a left side of the vehicle body.

Embodiments

Figure 1:
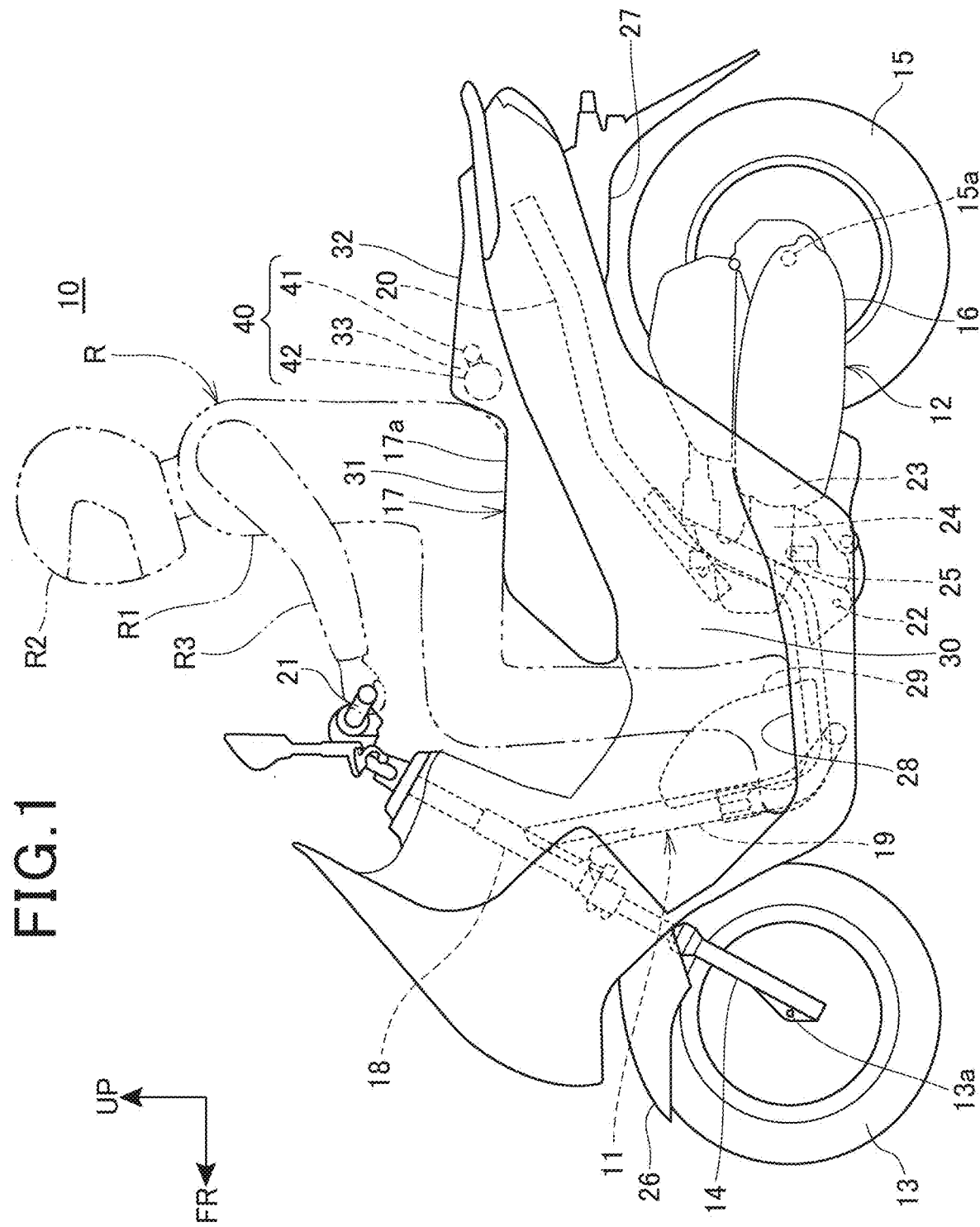
FIG. 1 is a side view of a saddle-ride vehicle according to an embodiment of the present invention.

FIG. 1 is a side view of a saddle-ride vehicle 10 according to an embodiment of the present invention.

The saddle-ride vehicle 10 is a vehicle including a vehicle body frame 11, a power unit 12 supported by the vehicle body frame 11, a front fork 14 that supports a front wheel 13 in a steerable manner, a swing arm 16 that supports a rear wheel 15, and a seat 17 for a rider.

The saddle-ride vehicle 10 is a vehicle on which a rider sits to straddle the seat 17. The seat 17 is provided above a rear portion of the vehicle body frame 11.

The vehicle body frame 11 includes a head pipe 18 provided in a front end portion of the vehicle body frame 11, a front frame 19 positioned behind the head pipe 18, and a rear frame 20 positioned behind the front frame 19. A front end portion of the front frame 19 is connected to the head pipe 18.

The seat 17 is supported by the rear frame 20.

The front fork 14 is supported by the head pipe 18 in a left-and-right steerable manner. The front wheel 13 is supported by an axle 13a provided at a lower end portion of the front fork 14. A steering handlebar 21 to be gripped by the rider is attached to an upper end portion of the front fork 14.

The swing arm 16 is supported by a pivot shaft 22, that is supported by the vehicle body frame 11. The pivot shaft 22 is a shaft extending horizontally in a vehicle width direction. The pivot shaft 22 is inserted through a front end portion of the swing arm 16. The swing arm 16 swings up and down about the pivot shaft 22.

The rear wheel 15 is supported by an axle 15a provided at a rear end portion of the swing arm 16.

The power unit 12 is disposed between the front wheel 13 and the rear wheel 15, and is supported by the vehicle body frame 11.

The power unit 12 is an internal combustion engine. The power unit 12 includes a crankcase 23 and a cylinder unit 24 that houses a reciprocating piston. An exhaust device 25 is connected to an exhaust port of the cylinder unit 24.

An output of the power unit 12 is transmitted to the rear wheel 15 by a driving force transmission member that connects the power unit 12 and the rear wheel 15.

In addition, the saddle-ride vehicle 10 also includes a front fender 26 that covers the front wheel 13 from above, a rear fender 27 that covers the rear wheel 15 from above, a step 28 on which the rider places his/her foot, and a fuel tank 29 that stores fuel used by the power unit 12.

The front fender 26 is attached to the front fork 14. The rear fender 27 and the step 28 are provided below the seat 17. The fuel tank 29 is supported by the vehicle body frame 11.

The saddle-ride vehicle 10 is a scooter-type motorcycle including a floor step 28 in front of and below the seat 17. The power unit 12 is a unit swing engine in which the internal combustion engine and the swing arm 16 are integrally formed. The power unit 12 is disposed immediately below the seat 17 and the rear frame 20.

The saddle-ride vehicle 10 also includes a vehicle body cover 30 covering the vehicle body such as the vehicle body frame 11 and the power unit 12.

The seat 17 is provided behind the handlebar 21 and above the rear frame 20. The seat 17 includes a front seat 31 on which a driver R (rider) sits and a rear seat 32 disposed behind the front seat 31.

The rear seat 32 has a stepped shape higher than the front seat 31. A passenger (rider) can sit on the rear seat 32, or luggage can be put on the rear seat 32.

The saddle-ride vehicle 10 includes an airbag device 40 that protects the driver R.

Figure 2:
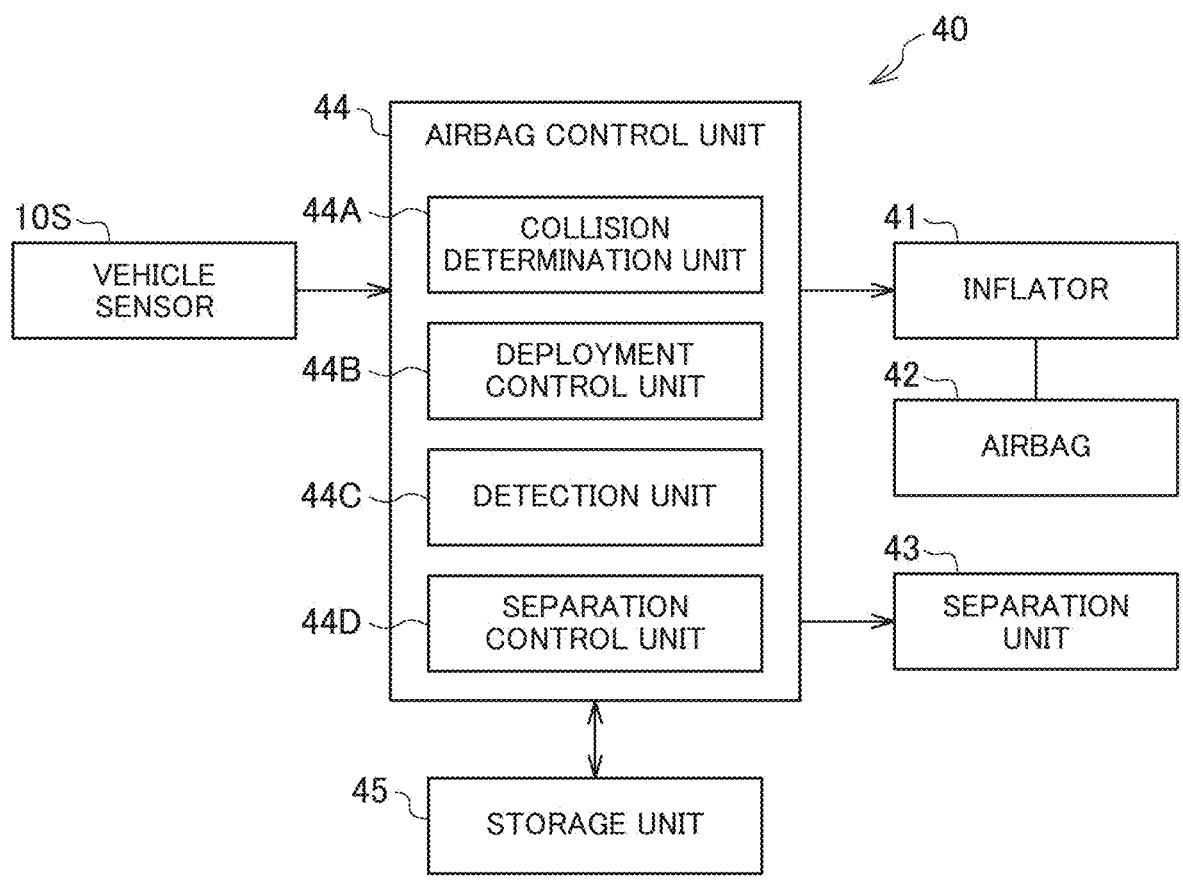
FIG. 2 is a block diagram of an airbag device.

FIG. 2 is a block diagram of the airbag device 40.

The airbag device 40 includes an inflator 41, an airbag 42 that inflates with a gas emitted from the inflator 41, a separation unit 43 that separates the airbag 42 from the saddle-ride vehicle 10, an airbag control unit 44 that controls an operation of the airbag device 40, and a storage unit 45.

The inflator 41 emits a gas into the airbag 42 under the control of the airbag control unit 44. The airbag 42 is formed by sewing a base fabric, and inflates and deploys by the pressure of the gas. The airbag 42 is housed in an airbag housing unit 33 (FIG. 1) in a folded state.

The airbag housing unit 33 is in a rear portion of the seat 17 and disposed behind the front seat 31, and thus disposed behind a seating position 17a of the driver R. That is, the vehicle body support position of the airbag 42 is behind the driver R.

The separation unit 43 separates the airbag 42 from the saddle-ride vehicle 10. In the example shown in FIG. 1, the separation unit 43 separates, from the saddle-ride vehicle 10, an airbag part that can protect the driver R by the airbag 42. Therefore, in a case where the driver R is released from the saddle-ride vehicle 10, it is possible to expect an effect of alleviating the impact acting on the driver R after the release. Any configuration for separating all or a part of the airbag 42 can be applied to the separation unit 43. The airbag part to be separated may include the inflator 41.

The airbag control unit 44 controls the units of the airbag device 40, and inputs detection results of a vehicle sensor 10S. The vehicle sensor 10S is a sensor group that detects information indicating front, rear, left, and right accelerations (including decelerations) of the saddle-ride vehicle 10, a vehicle speed, an inclination angle, a pitch angle, a yaw angle, and the like. The inclination angle is an inclination angle of the vehicle body based on the vertical direction, and the closer the inclination angle is to 90°, the closer the side surface of the saddle-ride vehicle 10 is to a road surface.

For example, the vehicle sensor 10S includes a vehicle speed sensor, a rotation speed sensor for the front and rear wheels, and an inertial sensor such as an inertial measurement unit (IMU). The inertial sensor detects front, rear, left, and right accelerations, a triaxial angular velocity, and the like. By performing predetermined conversion on the triaxial angular velocity, the roll angle, the pitch angle, and the yaw angle of the saddle-ride vehicle 10 can be specified, and the inclination angle of the saddle-ride vehicle 10 can be specified from the roll angle. The roll angle is, for example, an inclination angle from a road surface, and the inclination angle of the saddle-ride vehicle 10 is an inclination angle of the saddle-ride vehicle 10 to the left and right based on the vertical axis.

The airbag control unit 44 is composed of a CPU and peripheral circuits, and functions as a collision determination unit 44A, a deployment control unit 44B, a detection unit 44C, and a separation control unit 44D when the CPU executes a control program stored in the storage unit 45. The collision determination unit 44A specifies whether a collision of the saddle-ride vehicle 10 has occurred, or specifies a collision direction (front collision (also referred to as frontal collision), rear collision (also referred to as posterior collision or rear-end collision, and side collision (also referred to as lateral collision)), based on the detection results (for example, an acceleration in the longitudinal direction and an acceleration in the lateral direction of the saddle-ride vehicle 10) of the vehicle sensor 10S.

In a case where at least any one of the inclination angle and the angular velocity of the saddle-ride vehicle 10 satisfies a predetermined condition for predicting falling, the collision determination unit 44A of the present embodiment determines that falling is predicted.

For example, a predetermined condition that describes a combination of an inclination angle and an angular velocity in a case where it is regarded that falling occurs is set, and the collision determination unit 44A performs processing for determining that falling is predicted in a case where a combination of the inclination angle and the angular velocity that have been detected satisfies the predetermined condition. More specifically, map data in which a threshold of an angular velocity is set for each inclination angle is prepared in advance as a predetermined condition, and the collision determination unit 44A performs processing for determining that falling is predicted in a case where the detected angular velocity is equal to or greater than the threshold of the angular velocity specified from the map data based on the detected inclination angle.

The processing is not limited to the processing using a combination of an inclination angle and an angular velocity. For example, a threshold of an inclination angle in a case where it is regarded that falling occurs or a threshold of an angular velocity in a case where it is regarded that falling occurs may be set, and the collision determination unit 44A may perform processing for determining that falling is predicted in a case where the inclination angle or the angular velocity is equal to or greater than the threshold.

The deployment control unit 44B determines whether to operate the inflator 41 based on the determination result of the collision determination unit 44A, and operates the inflator 41 according to the determination result to deploy the airbag 42.

The detection unit 44C detects various types of information regarding a separation timing at which the airbag 42 is separated from the saddle-ride vehicle 10. The information to be detected includes an elapsed time TA (hereinafter, expressed as "airbag deployment time TA") since the deployment of the airbag 42, and a movement distance LA (hereinafter, expressed as "rider movement distance LA") of the driver R with respect to the saddle-ride vehicle 10.

The detection unit 44C has a clocking function, and detects the airbag deployment time TA by clocking the elapsed time since the ignition of the inflator 41.

In addition, the detection unit 44C acquires front, rear, left, and right accelerations of the saddle-ride vehicle 10 via the vehicle sensor 10S, and performs arithmetic processing for estimating the rider movement distance LA based on the accelerations, thereby detecting the rider movement distance LA.

The method of calculating the rider movement distance LA will be described.

The movement distance of the saddle-ride vehicle 10 can be calculated by second-order integration of the acceleration obtained by the vehicle sensor 10S. In a case where a collision of the saddle-ride vehicle 10 does not occur, the saddle-ride vehicle 10 and the driver R move integrally.

As the rider movement distance LA used in the actual calculation, instead of a constant integrated value of the output of the acceleration sensor that detects the acceleration, an integrated value obtained by removing a DC component of the output of the acceleration sensor or an integrated value for a certain period is used.

Meanwhile, in a case where a collision of the saddle-ride vehicle 10 occurs, even if the saddle-ride vehicle 10 decelerates due to the collision, the driver R tries to continue the inertial motion since the driver R is not restrained by the saddle-ride vehicle 10. Therefore, it is conceivable that the movement amount of the driver R approximates the movement amount of the saddle-ride vehicle 10 in a case where there is no collision with the main body.

Therefore, an estimated value of the rider movement distance LA can be calculated by calculating a difference in movement distance of the saddle-ride vehicle 10 between the case where the vehicle does not decelerate without collision and the case where the vehicle decelerates due to collision on the basis of the acceleration since the time of collision. The rider movement distance LA is a movement distance with respect to the saddle-ride vehicle 10 from the time of collision.

Based on the detection results of the detection unit 44C and the detection results of the vehicle sensor 10S, the separation control unit 44D operates the separation unit 43 after start of the deployment of the airbag 42, thereby separating the airbag 42. In a case where a collision of the saddle-ride vehicle 10 occurs, the airbag 42 can be separated and released from the saddle-ride vehicle 10 along with the driver R.

Figure 3:
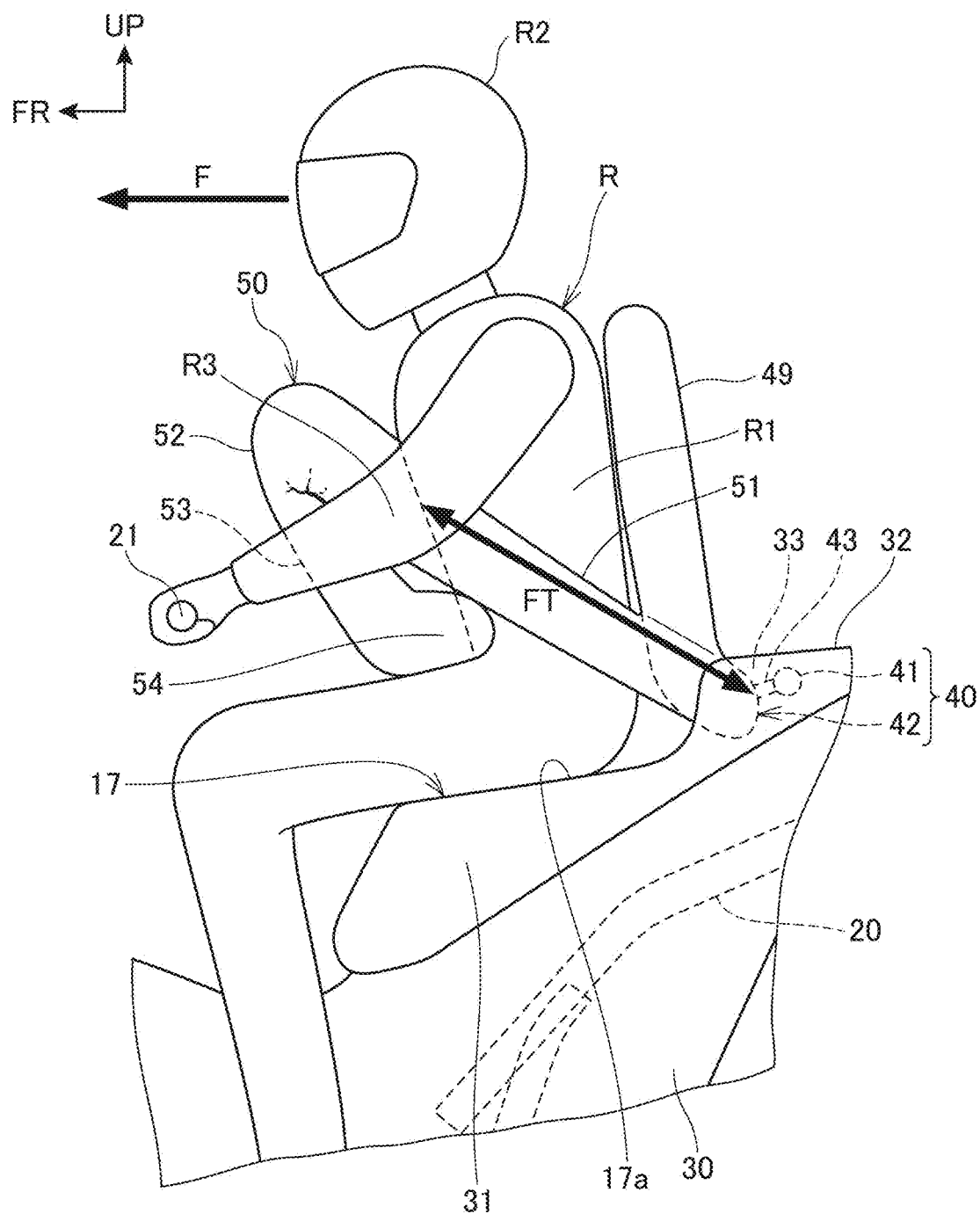
FIG. 3 is a left side view showing a state in which an airbag deploys to protect a driver.
Figure 4:
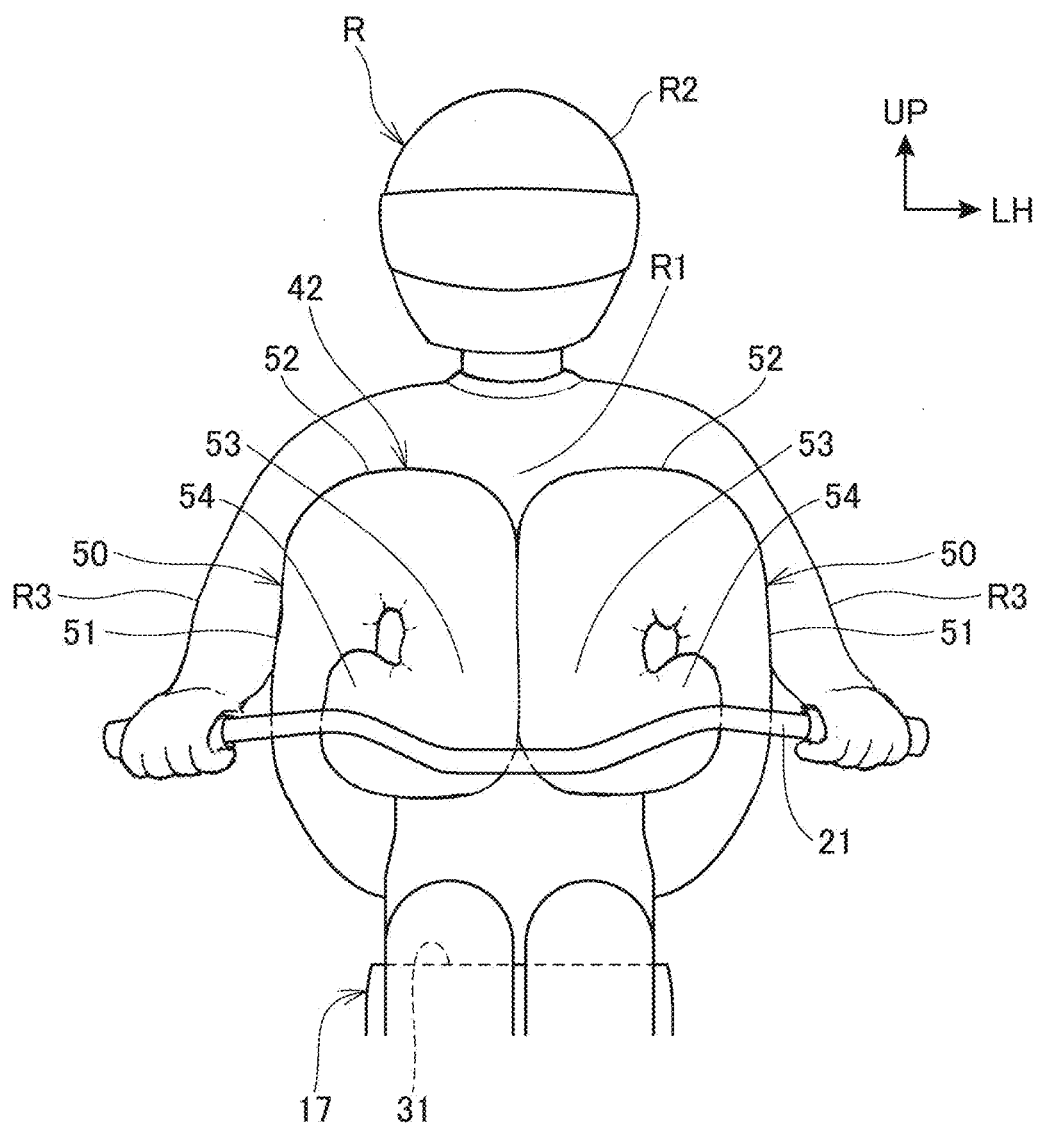
FIG. 4 is a front view showing from the front the state in which the airbag deploys to protect the driver.

FIG. 3 is a left side view showing a state in which the airbag 42 deploys to protect the driver R. FIG. 4 is a front view showing from the front the state in which the airbag 42 deploys to protect the driver R.

The airbag 42 includes a vehicle body support-side deployment portion 49 that is positioned, at the time of deployment, on the rear side of the driver R that is the vehicle body support position side (can also be referred to as the inflator 41 side or the airbag housing unit 33 side), and an opposite-side deployment portion 50 that is positioned, at the time of deployment, on the front side of the driver R that is the opposite side of the vehicle body support position.

The vehicle body support-side deployment portion 49 functions as a rear cover portion covering a body R1 of the driver R from the rear, and has a shape extending upward from the airbag housing unit 33. In addition, the opposite-side deployment portion 50 functions as a front cover portion covering the body R1 from the front, and has a shape extending upward up to the vicinity of a head R2 of the driver R.

The opposite-side deployment portion 50 includes a forward extension portion 51 that extends forward from both side portions of the vehicle body support-side deployment portion 49 on the outer side in the vehicle width direction, and an inward bending portion 52 that is bent inward in the vehicle width direction from the forward extension portion 51 and extends inward in the vehicle width direction. Further, the opposite-side deployment portion 50 includes a downward extension portion 53 that is bent from the inward bending portion 52 and extends downward, and a folding portion 54 that is folded back from the downward extension portion 53 toward the forward extension portion 51. The forward extension portion 51 covers the body R1 from the outside below an arm R3 of the driver R, and protects the body R1 from the outside. Therefore, the opposite-side deployment portion 50 covers the body R1 of the driver R from the front, the left, and the right.

Since the deploying airbag 42 covers the driver R from the periphery, the driver R can be protected from the front, the left, the right, and the rear. The airbag 42 is fixed to the saddle-ride vehicle 10 behind the driver R. Accordingly, in a case where a frontal collision occurs, that is, in a case where an inertia force F (FIG. 3) moving the driver R to the front of the saddle-ride vehicle 10 is generated as shown in the example in FIG. 3, the forward movement speed of the driver R can be reduced with a tension FT of the airbag 42 by delaying the separation of the airbag 42.

In addition, even in a case where an inertia force F moving the driver R to the side of the saddle-ride vehicle 10 is generated, the lateral movement speed of the driver R can be reduced to some extent with a tension FT of the airbag 42. In addition, since the airbag 42 also covers the driver R from the rear, even in a case where an inertia force F moving the driver R to the rear of the saddle-ride vehicle 10 is generated, the rearward movement speed of the driver R can be reduced to some extent with a tension FT of the airbag 42.

As described above, in a case where the driver R moves back and forth and right and left, the driver R and the saddle-ride vehicle 10 are connected via the airbag 42, so that the relative movement of the driver R with respect to the saddle-ride vehicle 10 is suppressed and the movement speed of the driver R can thus be reduced. Since the movement speed of the driver R is reduced, the release speed can also be reduced in a case where the driver R is released from the saddle-ride vehicle 10.

Figure 5:
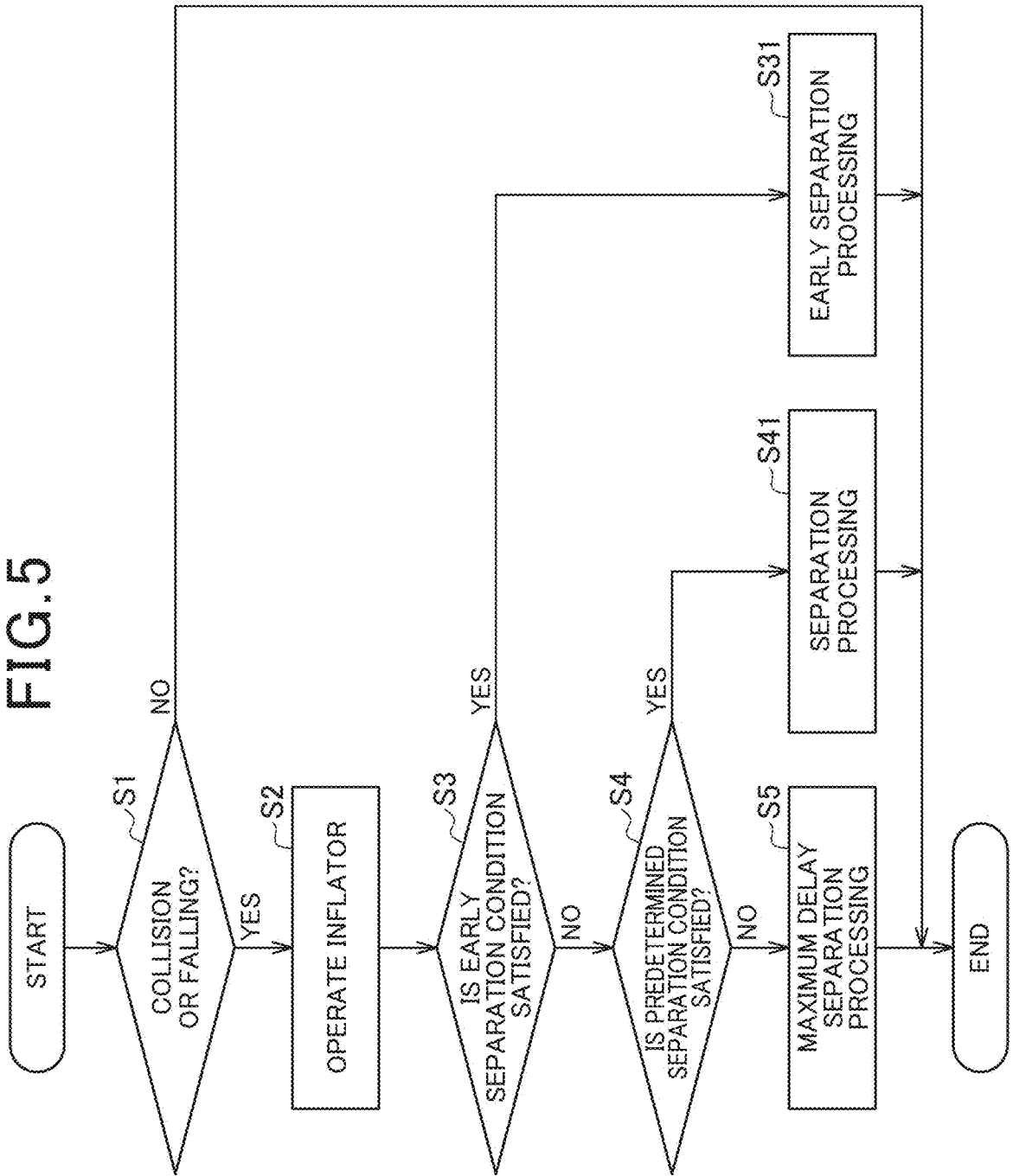
FIG. 5 is a flowchart showing an operation of an airbag control unit.

FIG. 5 is a flowchart showing an operation of the airbag control unit 44.

As shown in FIG. 5, the airbag control unit 44 causes the collision determination unit 44A to determine, based on the detection results of the vehicle sensor 10S, whether a collision or falling is predicted (Step S1).

In a case where neither collision nor falling is predicted (Step S1: NO), the airbag control unit 44 terminates the flowchart shown in FIG. 5. This flowchart is repeatedly executed at predetermined intervals, and whether a collision or falling is predicted is continuously monitored.

In a case where a collision or falling is predicted (Step S1: YES), that is, in a case where a calculated acceleration of the saddle-ride vehicle 10 is equal to or greater than a predetermined threshold or at least any one of the inclination angle and the angular velocity satisfies a predetermined condition for predicting falling, the airbag control unit 44 causes the deployment control unit 44B to operate the inflator 41 (Step S2). In the event of a slight collision or a collision at a low speed where the airbag 42 does not function effectively, the inflator 41 is not operated as before. In the present invention, the collision and the falling mean a collision and falling in which the airbag 42 functions effectively, unless otherwise described.

Next, the airbag control unit 44 causes the separation control unit 44D to determine whether a preset early separation condition is satisfied (Step S3). The early separation condition is a condition that specifies a situation in which it is desirable to separate the airbag 42 earlier than in a case where the airbag 42 is separated by maximum delay separation processing to be described later. The early separation condition can also be said to be a condition that specifies a situation in which it is desirable to separate the airbag 42 before the airbag 42 is completely deployed to a necessary and sufficient capacity.

The state in which the airbag 42 is completely deployed is a state in which the airbag 42 is deployed to the maximum capacity.

In the present embodiment, the early separation condition is a condition that specifies a state in which the saddle-ride vehicle 10 is likely to fall or a state in which the saddle-ride vehicle 10 is in a high-speed traveling state promptly. The early separation condition is stored in the storage unit 45 as information that specifies ranges and combinations of the vehicle speed, acceleration, inclination angle (roll angle), pitch angle, yaw angle, and/or angular velocity as information for specifying each state.

The state in which the saddle-ride vehicle 10 is likely to fall includes a state in which the inclination angle from the state in which the saddle-ride vehicle 10 is banked to the left and right and travels in a curve is equal to or greater than a predetermined inclination threshold, and can be specified by the inclination angle of the saddle-ride vehicle 10 or the like.

That is, the separation control unit 44D acquires vehicle information such as the vehicle speed, acceleration, inclination angle, and the like of the saddle-ride vehicle 10 via the vehicle sensor 10S, and determines whether the early separation condition is satisfied based on the acquired vehicle information.

In a case where the early separation condition is satisfied (Step S3: YES), the airbag control unit 44 performs early separation processing (Step S31). As the early separation processing, the airbag control unit 44 causes the separation control unit 44D to separate the airbag 42 early.

More specifically, in a case where at least any one of the inclination angle and the angular velocity of the saddle-ride vehicle 10 satisfies a predetermined condition for predicting falling, the separation control unit 44D causes the separation unit 43 to separate the airbag 42 without waiting until the airbag 42 is completely deployed (during deployment of the airbag 42). Therefore, in a state in which the saddle-ride vehicle 10 is likely to fall, the airbag 42 is quickly separated in a state in which it deploys to a predetermined state, and the airbag 42 does not interfere with the transition of the driver R to sliding on the road surface. In addition, in a case where the airbag 42 deploys as much as necessary for protecting the driver R, a rider protection effect by the airbag 42 can also be expected.

In a case where the saddle-ride vehicle 10 is in a high-speed traveling state, more specifically, in a case where the speed at the time of collision or immediately before collision is equal to or greater than a preset speed threshold, the airbag control unit 44 causes the separation unit 43 to separate the airbag 42 without waiting until the airbag 42 is completely deployed (during deployment of the airbag 42).

In the collision in the high-speed traveling state, there is a high possibility that the driver R may be released from the saddle-ride vehicle 10 before the airbag 42 is completely deployed. By the early separation processing, the airbag 42 can be caused to follow the driver R released from the saddle-ride vehicle 10 in a short time, and thus it is possible to expect an effect of alleviating the impact acting on the driver R after the release.

In a case where the early separation condition is not satisfied (Step S3: NO), the airbag control unit 44 causes the separation control unit 44D to determine whether a predetermined separation condition is satisfied (Step S4). The predetermined separation condition is a condition that specifies a state in which it is desirable to separate the airbag 42 earlier than in a case where the airbag 42 is separated by maximum delay separation processing to be described later.

The predetermined separation condition corresponds to the "predetermined condition" of the present invention.

In the present configuration, the airbag 42 is fixed to the saddle-ride vehicle 10 behind the driver R. Accordingly, in a case where the driver R moves forward with respect to the saddle-ride vehicle 10, the forward movement speed of the driver R can be effectively reduced by delaying the separation timing of the airbag 42.

In the present configuration, in a case where the driver R does not move forward with respect to the saddle-ride vehicle 10, such as a rear collision and a side collision, it is difficult to effectively reduce the release speed of the driver R even in a case where the separation timing of the airbag 42 is delayed.

The separation control unit 44D acquires vehicle information of the saddle-ride vehicle 10 via the detection unit 44C, and in a case where it is determined that a predetermined delay condition is satisfied based on the acquired vehicle information (Step S4: YES), the separation control unit 44D performs separation processing for separating the airbag 42 at a predetermined timing (Step S41).

Meanwhile, in a case where it is determined that the predetermined delay condition is not satisfied (Step S4: NO), the separation control unit 44D performs maximum delay separation processing (Step S5). The maximum delay separation processing is processing for separating the airbag 42 by the separation unit 43 after the airbag 42 is completely deployed. In the separation processing in Step S41, the airbag 42 may also be separated by the separation unit 43 after the airbag 42 is completely deployed according to the delay condition.

Figure 6:
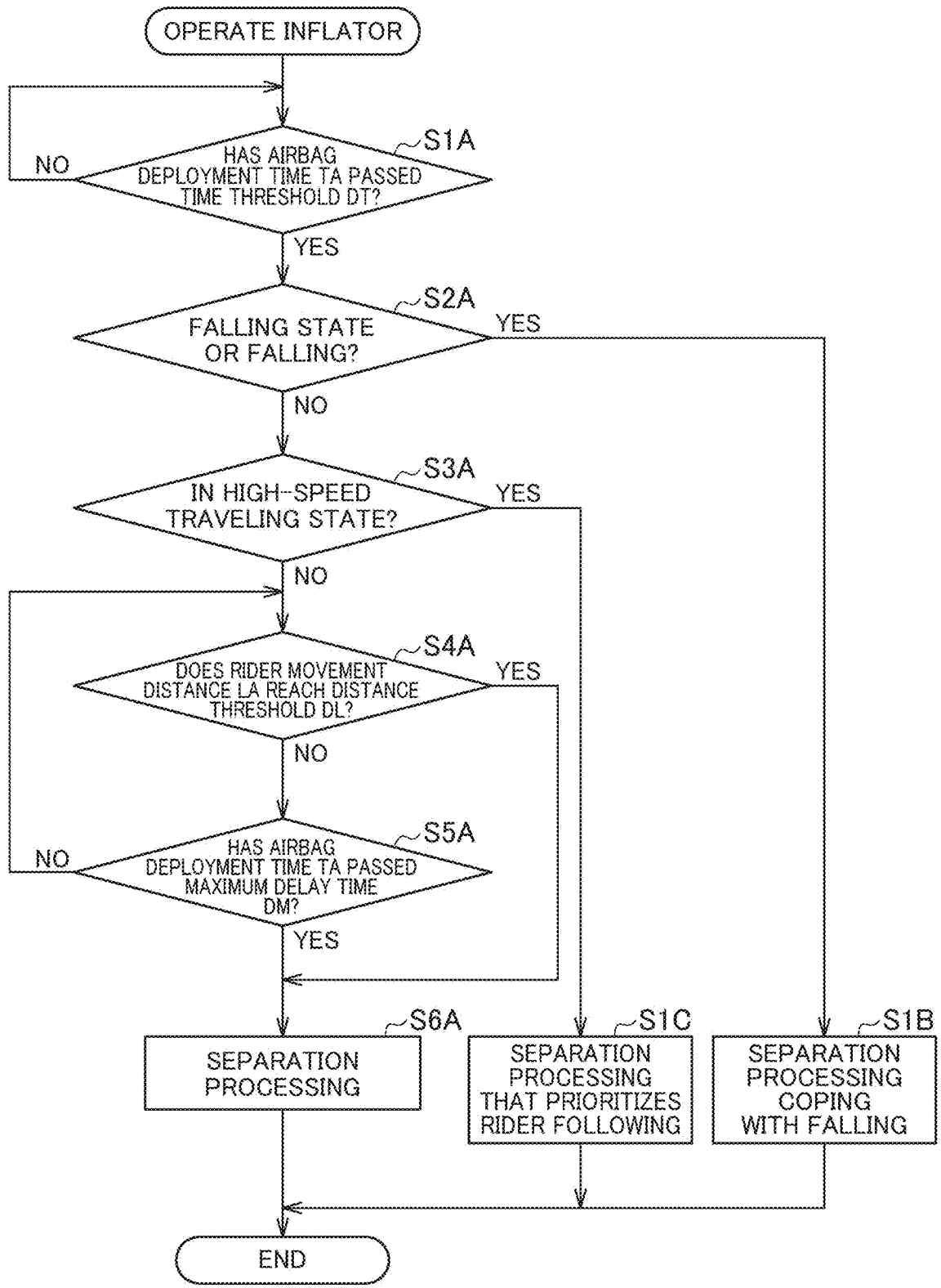
FIG. 6 is a flowchart showing an example of processing after Step S2 of the flowchart of FIG. 5.

FIG. 6 is a flowchart showing an example of processing after Step S2 of the flowchart of FIG. 5.

As shown in FIG. 6, in a case where the inflator 41 is operated by the processing of Step S2, the airbag control unit 44 determines whether the airbag deployment time TA has passed a preset time threshold DT (Step S1A).

The time threshold DT regulates a time equal to or longer than a lower limit value SB (referred to as "necessary and sufficient deployment state SB") of a necessary and sufficient deployment state in which the airbag 42 can sufficiently protect the driver R, and regulates a deployment time until the airbag 42 is deployed to, for example, 70%. It is preferable that the necessary and sufficient deployment state SB be a state in which the impact force acting between the airbag 42 and the driver R can be alleviated, and in a case where the driver R released from the saddle-ride vehicle 10 is brought into contact with a road surface, the impact force acting between the driver R and the road surface can be alleviated, and be a state in which the airbag 42 is deployed to a state in which it grips the driver R.

However, the necessary and sufficient deployment state SB may be a state appropriately set by a manufacturer of the saddle-ride vehicle 10 or the like, and is regulated by a deployment time TT (FIG. 7) from the start of deployment.

In a case where the airbag deployment time TA has passed the time threshold DT (Step S1A; YES), the airbag control unit 44 causes the collision determination unit 44A to determine whether a falling state or falling is predicted (Step S2A). In a case where the falling state or falling is predicted (Step S2A: YES), the airbag control unit 44 performs separation processing coping with falling (Step S1B).

The separation processing coping with falling is processing for separating the airbag 42 at a suitable timing when falling occurs. For example, the airbag 42 is separated after waiting until the necessary and sufficient deployment state SB is reached, so that the airbag 42 is separated after waiting until the airbag 42 inflates by the amount necessary for gripping the rider. Accordingly, the driver R can be quickly released along with the airbag 42 when the falling occurs.

The separation processing coping with falling may be performed later than a timing corresponding to the necessary and sufficient deployment state SB. The timing of separation may be appropriately set by a manufacturer of the saddle-ride vehicle 10 or the like. In addition, as the separation processing coping with falling, a threshold for determining whether there is any margin before grounding by using the angular velocity or the inclination angle may be provided, and in a case where there is a margin before grounding, processing for separating the airbag 42 after waiting until the airbag 42 is completely deployed may be performed.

In a case where the determination result in Step S2A is NO (Step S2; NO), the airbag control unit 44 determines whether the saddle-ride vehicle 10 has been in a high-speed traveling state, and more specifically, determines whether the saddle-ride vehicle 10 has been in a high-speed traveling state immediately before prediction of a collision or falling (Step S3A).

In a case where the saddle-ride vehicle 10 has been in a high-speed traveling state (Step S3A; YES), the airbag control unit 44 performs separation processing that prioritizes rider following (Step S1C).

The separation processing that prioritizes rider following is processing for separating the airbag 42 without waiting until the airbag 42 is completely deployed if the airbag 42 inflates by the amount necessary for gripping the rider, since the release of the driver R is predicted until the airbag 42 is completely deployed. The state in which the airbag 42 inflates by the amount necessary for gripping the rider is regulated by a timing set by a manufacturer of the saddle-ride vehicle 10 or the like, that is, a deployment time from the start of deployment.

Therefore, the airbag control unit 44 separates the airbag 42 at a timing when the airbag deployment time TA detected by the detection unit 44C reaches the deployment time. In the present embodiment, even before the elapse of the necessary and sufficient deployment state SB in FIG. 7 to be described later, the airbag 42 is separated in a case where the airbag 42 is deployed to a predetermined state. The airbag 42 may be separated at a timing of the necessary and sufficient deployment state SB.

In a case where the saddle-ride vehicle 10 has not been in a high-speed traveling state (Step S3A; YES), the airbag control unit 44 determines whether the rider movement distance LA detected by the detection unit 44C reaches a preset distance threshold DL (Step S4A).

The distance threshold DL is set to a value within a range of the rider movement distance LA that can reduce the movement speed of the driver R. Therefore, until the rider movement distance LA reaches the distance threshold DL, the movement speed of the driver R is reduced using the tension FT of the airbag 42 shown in FIG. 3.

In a case where the rider movement distance LA does not reach the distance threshold DL (Step S4A; NO), the airbag control unit 44 determines whether the airbag deployment time TA has passed a preset maximum delay time DM (Step S5A).

In a case where the airbag deployment time TA has not passed the maximum delay time DM (Step S5A; NO), the airbag control unit 44 proceeds to processing in Step S4A.

In a case where the rider movement distance LA reaches the distance threshold DL (Step S4A; YES), or the airbag deployment time TA has passed the maximum delay time DM (Step S5A; YES), the airbag control unit 44 performs processing for separating the airbag 42 (Step S6A).

The maximum delay time DM is set to a timing at which the separation of the airbag 42 after the time point at which the airbag 42 is completely deployed is guaranteed. Therefore, even in a case where the rider movement distance LA does not reach the distance threshold DL, the airbag 42 is reliably separated for a limited time period, and thus the driver R is easily released from the saddle-ride vehicle 10 along with the airbag 42. The maximum delay time DM may be set to an appropriate time by a manufacturer of the saddle-ride vehicle 10 or the like.

Figure 7:
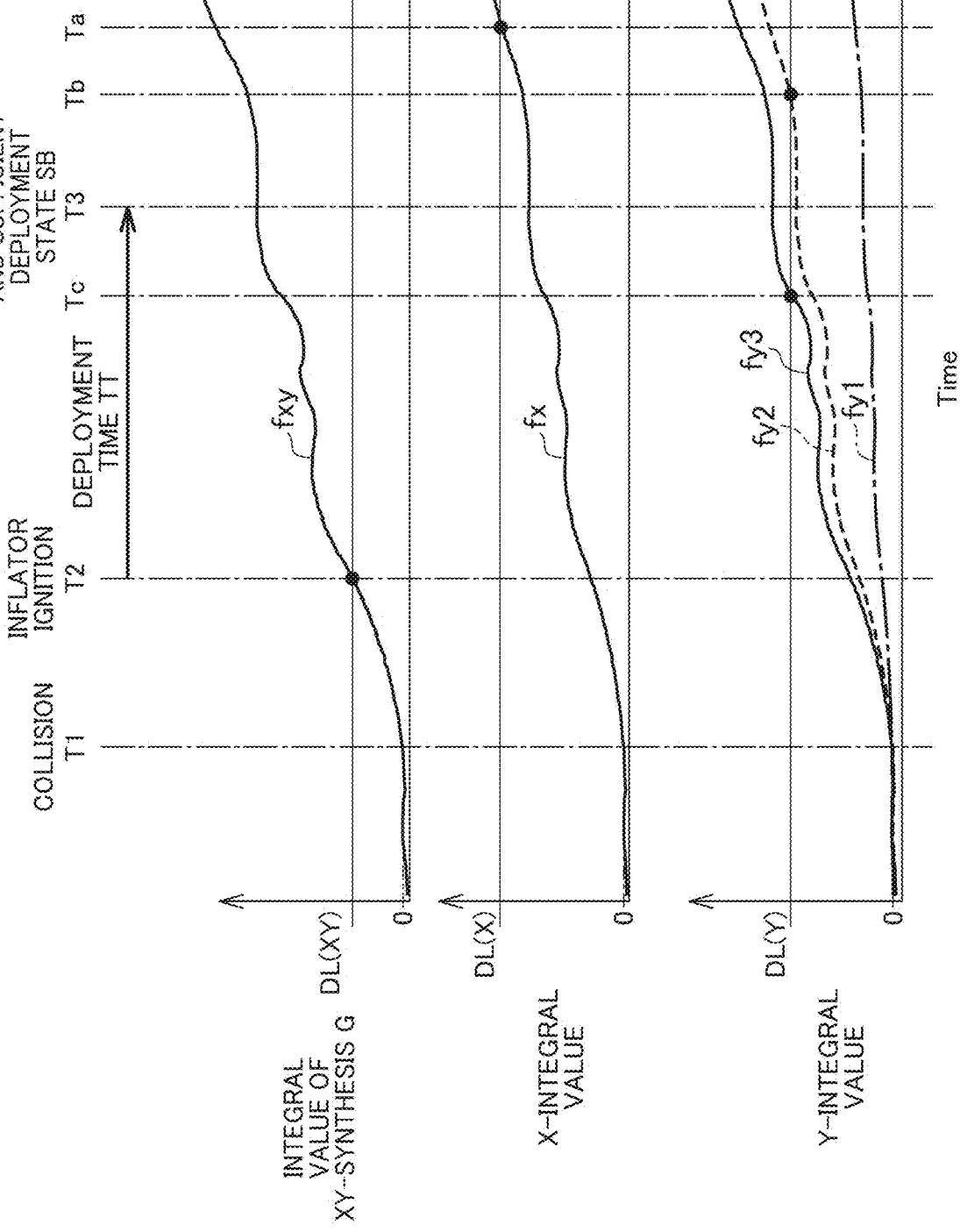
FIG. 7 is a sequence diagram illustrating a separation timing of the airbag at least in a front collision.

FIG. 7 is a sequence diagram illustrating the separation timing of the airbag 42 at least in a front collision. In FIG. 7, the "X-integral value" indicates a forward rider movement distance LA of the driver R, the "Y-integral value" indicates a lateral rider movement distance LA of the driver R, the "integral value of XY-synthesis G" indicates a synthesis value of the X-integral value and the Y-integral value, and the horizontal axis indicates the time.

For convenience of description, a change characteristic of the "X-integral value" is indicated by a reference sign fx, and a case where the driver R moves forward is illustrated. Change characteristics of the "Y-integral value" are indicated by reference signs fy1, fy2, and fy3, and a case where the lateral movement amount of the driver R increases in the order of the change characteristics fy1, fy2, and fy3 is illustrated. A change characteristic of the "integral value of XY-synthesis G" indicates a characteristic fxy of the synthesis of the change characteristics fx and fy.

The distance threshold DL is set for each of the X-integral value and the Y-integral value, and in FIG. 7, the distance threshold DL of the X-integral value is indicated by "distance threshold DL(X)", and the distance threshold DL of the Y-integral value is indicated by "distance threshold DL(Y)".

The distance threshold DL(X) corresponds to a "first distance threshold" of the present invention, and the distance threshold DL(Y) corresponds to a "second distance threshold" of the present invention.

In FIG. 7, a collision timing is a time point T1, an inflator ignition (deployment start) timing is a time point T2, and a timing of the necessary and sufficient deployment state SB is a time point T3. A deployment time TT from the inflator ignition T2 to the necessary and sufficient deployment state SB is a constant value.

A collision occurs, and in cases of the change characteristic fx of the X-integral value and the change characteristic fy1 of the Y-integral value, the change characteristic fx reaches the distance threshold DL(X) at a time point Ta, and the change characteristic fy1 is less than the distance threshold DL(Y) at the time point Ta. Since the time point Ta passes the time point T3 of the necessary and sufficient deployment state SB (the airbag deployment time TA passes the timing of the time threshold DT), the airbag 42 is separated at the time point Ta.

Since the airbag 42 is not separated until the X-integral value (rider movement distance LA in the longitudinal direction) reaches the distance threshold DL(X), it is possible to protect the driver R by the airbag 42 deployed more than in the necessary and sufficient deployment state SB, while effectively reducing the movement speed of the driver R by the airbag 42.

Meanwhile, in cases of the change characteristic fx of the X-integral value and the change characteristic fy2 of the Y-integral value, the change characteristic fy2 reaches the distance threshold DL(Y) at a time point Tb. This time point Tb precedes the time point Ta at which the change characteristic fx reaches the distance threshold DL(X), and passes the time point T3 of the necessary and sufficient deployment state SB. Therefore, the airbag 42 is separated at the time point Tb.

The airbag 42 is not separated until the Y-integral value (lateral rider movement distance LA) reaches the distance threshold DL(Y). Therefore, it is possible to protect the driver R by the airbag 42 deployed more than in the necessary and sufficient deployment state SB, while effectively reducing the lateral movement speed of the driver R by the airbag 42.

Further, in a case where the degree of side collision is strong, for example, the change characteristic fy3 of the Y-integral value is shown. In this case, the change characteristic fy3 reaches the distance threshold DL(Y) at a time point Tc. This time point Tc precedes the time point T3 of the necessary and sufficient deployment state SB. Therefore, the airbag 42 is not separated at the time point Tc. The airbag 42 is separated at a time point after the time point T3 of the necessary and sufficient deployment state SB has elapsed.

Even in a case where the Y-integral value (lateral rider movement distance LA) reaches the distance threshold DL(Y), the airbag 42 is not separated until the necessary and sufficient deployment state SB is reached. Therefore, it is possible to protect the driver R by the airbag 42 deployed more than in the necessary and sufficient deployment state SB, while effectively reducing the lateral movement speed of the driver R by the airbag 42.

Figure 8:
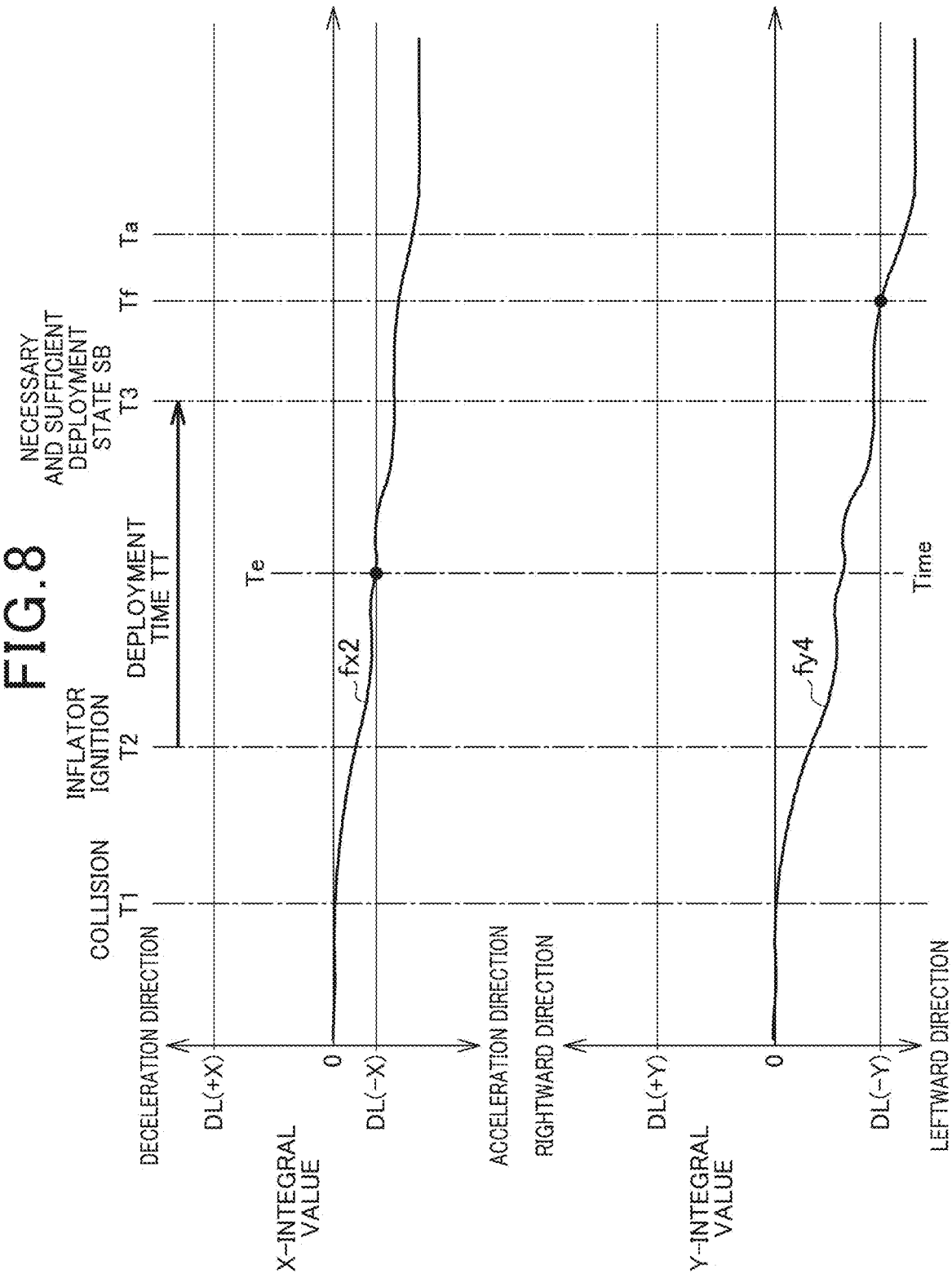
FIG. 8 is a sequence diagram illustrating a separation timing of the airbag in a rear or side collision.

FIG. 8 is a sequence diagram illustrating the separation timing of the airbag 42 in a rear or side collision. In FIG. 8, a distance threshold DL (corresponding to a first distance threshold) of the X-integral value is indicated by "distance threshold DL(+X)" in a deceleration direction and "distance threshold DL(−X)" in an acceleration direction.

The "distance threshold DL(+X)" in a deceleration direction corresponds to a threshold in one direction in the longitudinal direction of the vehicle in which the driver R is positioned with respect to the vehicle support position of the airbag 42. The "distance threshold DL(−X)" in the acceleration direction corresponds to a threshold in the other direction opposite to the one direction. Since the one direction is a direction in which the airbag 42 can most suppress the movement of the driver R, the "distance threshold DL(+X)" is set to a value larger than the "distance threshold DL(−X)" and a distance threshold DL (corresponding to a second distance threshold) of the Y-integral value.

The distance threshold DL of the Y-integral value includes a "distance threshold DL(+Y)" in the rightward direction and a "distance threshold DL(−Y)" in the leftward direction.

In a case where a rear-end collision occurs and a change characteristic fx2 of the X-integral value and a change characteristic fy4 of the Y-integral value are shown as shown in FIG. 8, the change characteristic fx2 reaches the distance threshold DL(−X) at a time point Te. Since the time point Te precedes the time point T3 of the necessary and sufficient deployment state SB, the airbag 42 is not separated at the time point Te. The airbag 42 is separated at a time point after the time point T3 of the necessary and sufficient deployment state SB has elapsed.

In a case where a rear-end collision occurs, the driver R can be separated from the vehicle colliding from behind by quickly separating the airbag 42. Therefore, the distance threshold DL(−X) is set to a small value so that the airbag 42 can be quickly separated, whereby the airbag 42 is separated at the timing of the necessary and sufficient deployment state SB in a case where a rear-end collision occurs.

In a case where a collision occurs on only the side and the change characteristic fy4 of the Y-integral value is shown, the change characteristic fy4 reaches the distance threshold DL(−Y) at a time point Tf. Since the time point Tf passes the time point T3 of the necessary and sufficient deployment state SB, the airbag 42 is separated at the time point Tf.

The airbag 42 is not separated until the Y-integral value (lateral rider movement distance LA) reaches the distance threshold DL(Y). Therefore, it is possible to protect the driver R by the airbag 42 deployed more than in the necessary and sufficient deployment state SB, while effectively reducing the lateral movement speed of the driver R by the airbag 42.

As described above, the airbag device 40 includes the separation unit 43 that separates the airbag 42 deploying around the driver R from the saddle-ride vehicle 10, the detection unit 44C that detects an elapsed time (airbag deployment time TA or the like) from when the airbag 42 is deployed, and the separation control unit 44D that causes the separation unit 43 to separate the airbag 42 in a case where a separation condition (predetermined condition) including a first condition that the elapsed time detected by the detection unit 44C exceeds the time threshold DT is satisfied.

According to this configuration, by delaying the separation timing of the airbag 42 in consideration of the elapsed time from when the airbag 42 is deployed, the release speed of the driver R is reduced using the airbag 42, and it becomes easier to reduce the release speed of the driver R.

In addition, the time threshold DT is larger than a time until the airbag 42 is deployed to a predetermined state (necessary and sufficient deployment state SB). According to this configuration, the separation timing of the airbag 42 is delayed, and the protection effect by the airbag 42 when the driver R is released from the saddle-ride vehicle 10 is easily obtained.

In addition, the detection unit 44C performs arithmetic processing for estimating, based on the acceleration of the saddle-ride vehicle 10, the rider movement distance LA that is the movement distance of the driver R with respect to the saddle-ride vehicle 10. The separation condition further includes a second condition that the rider movement distance LA exceeds the preset distance threshold DL, and the separation control unit 44D causes the separation unit 43 to separate the airbag 42 in a case where at least the first condition and the second condition are satisfied. According to this configuration, the separation timing of the airbag 42 can be delayed in consideration of the rider movement distance LA, the release speed of the driver R is reduced using the airbag 42, and it becomes easier to reduce the release speed of the driver R.

In addition, since the existing acceleration sensor of the saddle-ride vehicle can be used, it is easier to reduce the cost and the number of components compared to using another sensor for detecting the rider movement distance LA.

In addition, the detection unit 44C acquires an acceleration in the longitudinal direction of the vehicle and an acceleration in the lateral direction of the vehicle, estimates a movement distance (X-integral values in FIGS. 7 and 8) of the driver R in the longitudinal direction of the vehicle with respect to the saddle-ride vehicle 10 based on the acceleration in the longitudinal direction of the vehicle, and estimates a movement distance (Y-integral values in FIGS. 7 and 8) of the driver R in the lateral direction of the vehicle with respect to the saddle-ride vehicle 10 based on the acceleration in the lateral direction of the vehicle. The distance threshold DL includes the first distance threshold (the distance threshold DL(X) in FIG. 7, and the distance threshold DL(+X) and the distance threshold DL(-X) in FIG. 8) that is a distance threshold in the longitudinal direction of the vehicle, and the second distance threshold (the distance threshold DL(Y) in FIG. 7, and the distance threshold DL(+Y) and the distance threshold DL(-Y) in FIG. 8) that is a distance threshold in the lateral direction of the vehicle.

The detection unit 44C determines that the second condition is satisfied in a case where any of the case where the movement distance of the driver R in the longitudinal direction of the vehicle exceeds the first distance threshold and the case where the movement distance of the driver R in the lateral direction of the vehicle exceeds the second distance threshold is satisfied.

According to this configuration, the movement speed of the driver R can be reduced by the airbag 42 until the driver R moves to any of the distance thresholds DL respectively set for the longitudinal direction and the lateral direction. Therefore, the movement speed of the driver R in the longitudinal direction and the lateral direction is suppressed, and the release from the saddle-ride vehicle 10 is thus easily carried out.

As shown in FIG. 8, the first distance threshold includes the distance threshold DL(+X) corresponding to a threshold in one direction (forward direction) in the longitudinal direction of the vehicle in which the driver R is positioned with respect to the vehicle support position where the airbag 42 is supported by the saddle-ride vehicle 10, and the distance threshold DL(-X) corresponding to a threshold in the other direction (rearward direction). A part (opposite-side deployment portion 50) of the airbag 42 is deployed at least in one direction for the driver R, and a threshold (distance threshold DL(+X)) in one direction is set to a value larger than a threshold (distance threshold DL(-X)) in the other direction and the second distance threshold (the distance threshold DL(+Y) and the distance threshold DL(-Y)).

According to this configuration, since the airbag 42 is deployed in one direction across the driver R, the airbag 42 easily reduces the movement speed of the driver R in one direction. For the movement of the driver R in one direction, the airbag 42 effectively reduces the movement speed of the driver R, and for the movement of the driver R in other directions, the airbag 42 is quickly separated, so that the driver R is easily released from the saddle-ride vehicle 10 early along with the airbag 42.

In addition, in a case where at least any one of the inclination angle and the angular velocity of the saddle-ride vehicle 10 satisfies a predetermined condition for predicting falling, the airbag control unit 44 separates the airbag 42 when the airbag 42 is deployed to a predetermined state, even before the rider movement distance LA exceeds the distance threshold DL(equivalent to a case where the second condition is not established).

According to this configuration, the driver R is easily released quickly in a case where falling is predicted. For example, in a case of falling during curving, the impact force on the driver R from a road surface is relatively small, and the release of the driver R can be prioritized.

In addition, the airbag 42 is deployed in a case where a collision is detected, and in a preset high-speed traveling state when a collision is detected, the separation control unit 44D separates the airbag 42 in a case where the airbag 42 is deployed to a predetermined state, even before the rider movement distance LA exceeds the distance threshold DL (equivalent to a case where the second condition is not established). According to this configuration, in a high-speed traveling state, the driver R is quickly released from the saddle-ride vehicle 10 while being protected by the airbag 42, which makes it easier for the driver R to avoid contact with other vehicles and the like.

Note that the above embodiment merely indicates an aspect of the present invention, and the present invention is not limited to the above embodiment. For example, in the above-described embodiment, the case where the vehicle support position of the airbag 42 is behind the driver R has been described, but the present invention is not limited thereto. For example, the vehicle support position may be in front of the driver R.

Figure 9:
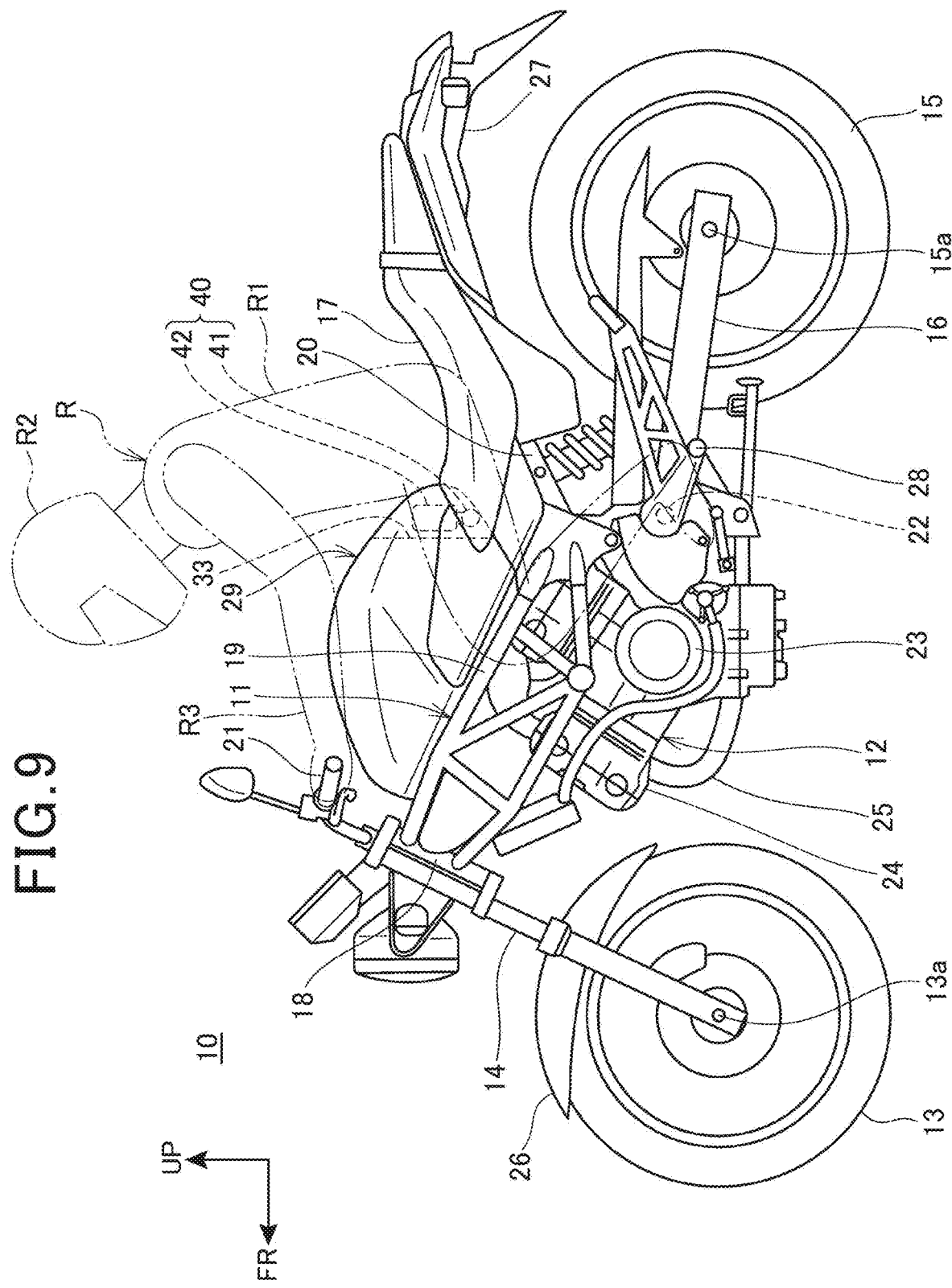
FIG. 9 is a side view showing an airbag device according to a modification example together with a saddle-ride vehicle.
Figure 10:
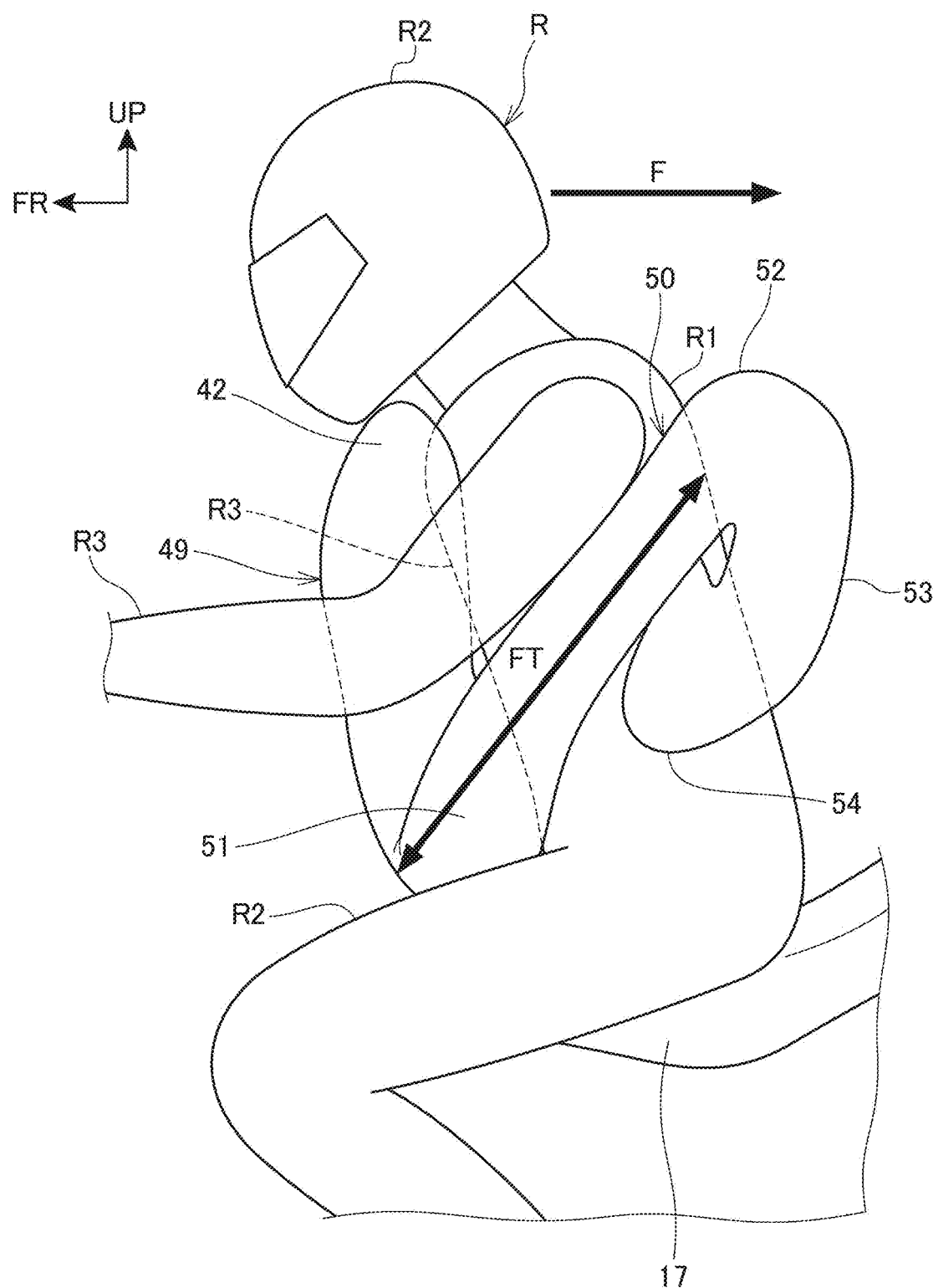
FIG. 10 is a left side view showing a state in which the airbag shown in FIG. 9 deploys to protect a driver.

FIG. 9 is a side view showing an airbag device 40 according to a modification example together with a saddle-ride vehicle 10. FIG. 10 is a left side view showing a state in which the airbag 42 shown in FIG. 9 deploys to protect a driver R. Configurations similar to the above-described members are denoted by the same reference signs, and duplicate description thereof will be omitted.

The airbag device 40 according to the modification example includes an airbag 42 that is supported by the saddle-ride vehicle 10 ahead of the driver R and deploys to areas including the rear of the driver R.

Specifically, as shown in FIG. 9, an airbag housing unit 33 is disposed at a rear end portion of a fuel tank 29, and the airbag 42 is housed in the airbag housing unit 33 in a folded state. Similarly to a front wheel 13, the airbag 42 is disposed at the center in a vehicle width direction.

As shown in FIG. 10, the airbag 42 includes a vehicle body support-side deployment portion 49 that is positioned, at the time of deployment, on the front side of the driver R that is the vehicle body support position side (can also be referred to as the inflator 41 side or the airbag housing unit 33 side), and an opposite-side deployment portion 50 that is positioned, at the time of deployment, on the rear side of the driver R that is the opposite side of the vehicle body support position.

The vehicle body support-side deployment portion 49 functions as a front cover portion covering a body R1 of the driver R from the front, and has a shape extending upward from the airbag housing unit 33. In addition, the opposite-side deployment portion 50 functions as a rear cover portion covering the body R1 from the rear, and has a shape extending upward up to the vicinity of a head R2 of the driver R.

The opposite-side deployment portion 50 includes a forward extension portion 51 that extends rearward from both side portions of the vehicle body support-side deployment portion 49 on the outer side in the vehicle width direction, and an inward bending portion 52 that is bent inward in the vehicle width direction from the forward extension portion 51 and extends inward in the vehicle width direction. Further, the opposite-side deployment portion 50 includes a downward extension portion 53 that is bent from the inward bending portion 52 and extends downward, and a folding portion 54 that is folded back from the downward extension portion 53 toward the forward extension portion 51. The forward extension portion 51 covers the body R1 from the outside below an arm R3 of the driver R, and protects the body R1 from the outside. Therefore, the opposite-side deployment portion 50 covers the body R1 of the driver R from the rear, the left, and the right.

Since the deploying airbag 42 covers the driver R from the periphery, the driver R can be protected from the front, the left, the right, and the rear. The airbag 42 is fixed to the saddle-ride vehicle 10 ahead of the driver R. Accordingly, in a case where a rear-end collision occurs, that is, in a case where an inertia force F moving the driver R to the rear of the saddle-ride vehicle 10 is generated as shown in the example in FIG. 10, the rearward movement speed of the driver R can be reduced with a tension FT of the airbag 42 by delaying the separation of the airbag 42.

In addition, even in a case where an inertia force F moving the driver R to the side of the saddle-ride vehicle 10 is generated, the lateral movement speed of the driver R can be reduced to some extent with a tension FT of the airbag 42. In addition, since the airbag 42 also covers the driver R from the front, even in a case where an inertia force F moving the driver R to the front of the saddle-ride vehicle 10 is generated, the forward movement speed of the driver R can be reduced to some extent with a tension FT of the airbag 42.

Therefore, by providing, also in this airbag device 40, an airbag control unit 44 that detects an elapsed time (airbag deployment time TA or the like) from when the airbag 42 is deployed, and causes the separation unit 43 to separate the airbag 42 in a case where a separation condition (predetermined condition) including the elapse of a predetermined time (corresponding to a time threshold DT) is satisfied, it is possible to obtain various effects of the above-described embodiment, such as reducing the release speed of the driver R using the airbag 42 and facilitating the reduction of the release speed of the driver R.

In addition, in the above-described embodiment, the case where the rider movement distance LA that is the movement distance of the driver R with respect to the saddle-ride vehicle 10 is estimated based on the acceleration of the saddle-ride vehicle 10, and the separation timing of the airbag 42 is delayed in consideration of the rider movement distance LA has been illustrated, but the present invention may not be limited to this configuration.

Figure 11:
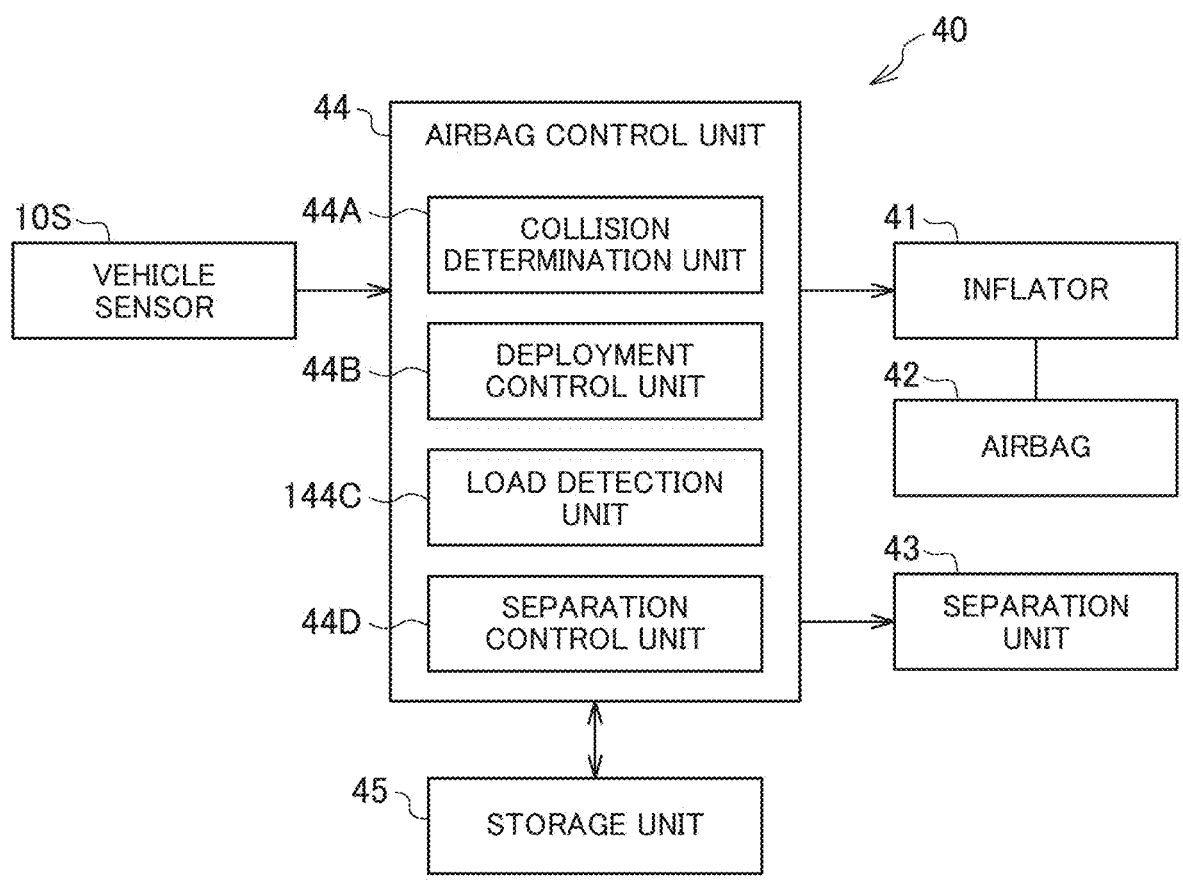
FIG. 11 is a block diagram showing a modification example of the airbag device.

For example, as shown in FIG. 11, the airbag control unit 44 is provided with a load detection unit 144C that detects a tension FT with which the airbag 42 is pulled by the movement of the driver R. The separation condition further includes a third condition that the tension FT exceeds a preset tension threshold, and the separation control unit 44D causes the separation unit 43 to separate the airbag 42 in a case where at least the first condition and the third condition are satisfied. Therefore, the separation timing of the airbag 42 can be delayed until the tension FT exceeds the tension threshold, and the release speed of the driver R can be effectively reduced.

The tension threshold may be set to an appropriate value by a manufacturer of the saddle-ride vehicle 10 or the like, and is set to, for example, an upper limit of the tension with which the airbag 42 is not broken or a value near the upper limit.

In this case, the saddle-ride vehicle 10 may be provided with a load sensor that detects the tension FT as one of the vehicle sensor 10S, and the load detection unit 144C may acquire a detection result of the load sensor. For example, the load detection unit 144C has a configuration in which, from the detection unit 44C, the function related to the rider movement distance LA is removed and a function related to the tension FT is added instead. However, the present invention is not limited to this configuration, and the load detection unit 144C may have a configuration in which a function related to the tension FT is added to the detection unit 44C to delay the separation timing of the airbag 42 in consideration of both of the tension FT and the rider movement distance LA.

In the above-described embodiment, the case where the rider movement distance LA (corresponding to the Y-integral value) in the lateral direction is calculated in addition to the rider movement distance LA (corresponding to the X-integral value) in the longitudinal direction has been described. However, a configuration in which the rider movement distance LA in the lateral direction is not calculated may be employed.

For example, in a case where, before the movement distance (corresponding to the X-integral value) of the driver R in one direction (forward direction in FIG. 3, backward direction in FIG. 4) with respect to the saddle-ride vehicle 10 exceeds the first distance threshold (the distance threshold DL(X) in FIG. 7), the acceleration in the lateral direction or the acceleration in the other direction (forward direction in FIG. 3, backward direction in FIG. 4) exceeds a predetermined threshold, the airbag control unit 44 may separate the airbag 42 before the movement distance (corresponding to the X-integral value) in one direction exceeds the first distance threshold. Instead of using the movement distance calculated by second-order integration, a speed calculated by first-order integration may be used instead of the acceleration.

That is, the separation condition includes a fourth condition that, before the movement distance (corresponding to the X-integral value) in one direction in the longitudinal direction of the vehicle in which the driver R is positioned with respect to the vehicle support position where the airbag 42 is supported by the saddle-ride vehicle 10 exceeds the first distance threshold, at least any one of the acceleration in the lateral direction of the vehicle, the acceleration in the other direction opposite to the one direction, the speed in the lateral direction of the vehicle, and the speed in the other direction opposite to the one direction exceeds a predetermined threshold. The separation control unit 44D may cause the separation unit 43 to separate the airbag 42 in a case where the first condition and the fourth condition are satisfied.

According to this configuration, the airbag 42 is easily separated quickly at the time of side collision. In addition, since the airbag 42 can be separated at the time of side collision without processing for calculating a movement distance in the lateral direction and the like, it is possible to reduce processing capacity required for the airbag control unit 44, which is advantageous for cost reduction.

Although the case where the present invention is applied to the airbag device 40 for the driver R has been described, the present invention may be applied to an airbag device for a rider including a passenger.

Although the case where the present invention is applied to the airbag device 40 of the motorcycle shown in FIG. 1 and the like has been described, the present invention is not limited thereto, and the present invention may be applied to an airbag device of a vehicle such as other motorcycles and saddle-ride vehicles including three-wheel types and four-wheel types.

Configuration Supported by Above Embodiments

The above embodiments support the following configurations.

(Configuration 1) An airbag device that is mounted on a vehicle and provided with an airbag that deploys around a rider, the airbag device including: a separation unit that separates the airbag from the vehicle; a detection unit that detects an elapsed time since deployment of the airbag; and a separation control unit that causes the separation unit to separate the airbag in a case where a predetermined condition including a first condition that the elapsed time detected by the detection unit exceeds a time threshold is satisfied.

According to this configuration, by delaying the separation timing of the airbag in consideration of the elapsed time from when the airbag is deployed, the release speed of the rider is reduced using the airbag, and it becomes easier to reduce the release speed of the rider.

(Configuration 2) The airbag device according to Configuration 1, in which the time threshold is larger than a time until the airbag (42) is deployed to a predetermined state.

According to this configuration, a protection effect by the airbag when the rider is released from the vehicle is easily obtained.

(Configuration 3) The airbag device according to Configuration 1 or 2, in which the detection unit performs arithmetic processing for estimating a movement distance of the rider with respect to the vehicle based on an acceleration of the vehicle, the predetermined condition further includes a second condition that the movement distance exceeds a preset distance threshold, and the separation control unit causes the separation unit to separate the airbag in a case where at least the first condition and the second condition are satisfied.

According to this configuration, the separation timing of the airbag can be delayed in consideration of the movement distance of the rider with respect to the vehicle. Since the acceleration sensor of the vehicle can be used, it is easier to reduce the cost and the number of components compared to using another sensor for detecting the movement distance.

(Configuration 4) The airbag device according to Configuration 3, in which the detection unit acquires an acceleration in a longitudinal direction of the vehicle and an acceleration in a lateral direction of the vehicle, estimates a movement distance of the rider in the longitudinal direction of the vehicle with respect to the vehicle based on the acceleration in the longitudinal direction of the vehicle, and estimates a movement distance of the rider in the lateral direction of the vehicle with respect to the vehicle based on the acceleration in the lateral direction of the vehicle, the distance threshold includes a first distance threshold that is a distance threshold in the longitudinal direction of the vehicle and a second distance threshold that is a distance threshold in the lateral direction of the vehicle, and it is determined that the second condition is satisfied in a case where any of a case where the movement distance of the rider in the longitudinal direction of the vehicle exceeds the first distance threshold and a case where the movement distance of the rider in the lateral direction of the vehicle exceeds the second distance threshold is satisfied.

According to this configuration, the movement speed of the rider can be reduced by the airbag until the rider moves to any of the distance thresholds respectively set for the longitudinal direction and the lateral direction. Therefore, the movement speed of the rider in the longitudinal direction and the lateral direction is suppressed, and the release from the vehicle is thus easily carried out.

(Configuration 5) The airbag device according to Configuration 4, in which the first distance threshold includes a threshold in one direction and a threshold in an other direction in the longitudinal direction of the vehicle in which the rider is positioned with respect to a vehicle support position where the airbag is supported by the vehicle, a part of the airbag is deployed at least in the one direction for the rider, and the threshold in one direction is larger than the threshold in the other direction and the second distance threshold.

According to this configuration, since the airbag is deployed in one direction for the rider, the airbag easily reduces the movement speed of the rider in one direction. For the movement of the rider in one direction, the airbag effectively reduces the movement speed of the rider, and for the movement of the rider in other directions, the airbag can be quickly separated, so that the rider is easily released from the vehicle early along with the airbag.

(Configuration 6) The airbag device according to Configuration 1 or 2, in which a load detection unit that detects a tension with which the airbag is pulled by movement of the rider is provided, the predetermined condition further includes a third condition that the tension exceeds a preset tension threshold, and the separation control unit causes the separation unit to separate the airbag in a case where the first condition and the third condition are satisfied.

According to this configuration, the separation timing of the airbag can be delayed in consideration of the tension with which the airbag is pulled by the movement of the rider, and it becomes easier to efficiently reduce the movement speed of the rider by the airbag.

(Configuration 7) The airbag device according to Configuration 3, in which the predetermined condition includes a fourth condition that, before a movement distance of the rider with respect to the vehicle in one direction in a longitudinal direction of the vehicle in which the rider is positioned with respect to a vehicle support position where the airbag is supported by the vehicle exceeds the distance threshold, at least any one of an acceleration in a lateral direction of the vehicle, an acceleration in an other direction opposite to the one direction, a speed in the lateral direction of the vehicle, and a speed in the other direction opposite to the one direction exceeds a predetermined threshold, and the separation control unit causes the separation unit to separate the airbag in a case where the first condition and the fourth condition are satisfied.

According to this configuration, the airbag is easily separated quickly at the time of side collision. In addition, since the airbag can be separated at the time of side collision without processing for calculating a movement distance in the lateral direction and the like, it is possible to reduce processing capacity required for the airbag control unit, which is advantageous for cost reduction.

(Configuration 8) The airbag device according to any one of Configurations 3 to 5, in which in a case where at least any one of an inclination angle and an angular velocity of the vehicle satisfies a predetermined condition, the detection unit separates the airbag when the airbag is deployed to a predetermined state, even in a case where the second condition is not established.

According to this configuration, the rider is easily released quickly in a case where falling is predicted.

(Configuration 9) The airbag device according to any one of Configurations 3 to 5, and 8, in which the airbag is deployed in a case where a collision of the vehicle is detected, and in a preset high-speed traveling state when the collision is detected, even in a case where the second condition is not established, the separation control unit separates the airbag without delay when the airbag is deployed to a predetermined state.

According to this configuration, in a high-speed traveling state, the rider is quickly released from the vehicle while being protected by the airbag, which makes it easier for the rider to avoid contact with other vehicles and the like.

REFERENCE SIGNS LIST 10 saddle-ride vehicle
40 airbag device
41 Inflator
42 airbag
43 separation unit
44 airbag control unit
44A collision determination unit
44B deployment control unit
44C detection unit
44D separation control unit
45 storage unit
144C load detection unit
LA rider movement distance
R driver (rider)
SB necessary and sufficient deployment state

The invention claimed is:

1. An airbag device that is mounted on a vehicle and provided with an airbag that deploys around a rider, the airbag device comprising:
a separation unit that separates the airbag from the vehicle;
a detection unit that detects an elapsed time since deployment of the airbag; and
a separation control unit that causes the separation unit to separate the airbag in a case where a predetermined condition including a first condition that the elapsed time detected by the detection unit exceeds a time threshold is satisfied.

2. The airbag device according to claim 1, wherein the time threshold is larger than a time until the airbag is deployed to a predetermined state.

3. The airbag device according to claim 2, wherein the detection unit performs arithmetic processing for estimating a movement distance of the rider with respect to the vehicle based on an acceleration of the vehicle,
the predetermined condition further includes a second condition that the movement distance exceeds a preset distance threshold, and
the separation control unit causes the separation unit to separate the airbag in a case where at least the first condition and the second condition are satisfied.

4. The airbag device according to claim 3, wherein the detection unit acquires an acceleration in a longitudinal direction of the vehicle and an acceleration in a lateral direction of the vehicle, estimates a movement distance of the rider in the longitudinal direction of the vehicle with respect to the vehicle based on the acceleration in the longitudinal direction of the vehicle, and estimates a movement distance of the rider in the lateral direction of the vehicle with respect to the vehicle based on the acceleration in the lateral direction of the vehicle,
the distance threshold includes a first distance threshold that is a distance threshold in the longitudinal direction of the vehicle and a second distance threshold that is a distance threshold in the lateral direction of the vehicle, and
it is determined that the second condition is satisfied in a case where any of a case where the movement distance of the rider in the longitudinal direction of the vehicle exceeds the first distance threshold and a case where the movement distance of the rider in the lateral direction of the vehicle exceeds the second distance threshold is satisfied.

5. The airbag device according to claim 4, wherein the first distance threshold includes a threshold in one direction and a threshold in an other direction in the longitudinal direction of the vehicle in which the rider is positioned with respect to a vehicle support position where the airbag is supported by the vehicle,
a part of the airbag is deployed at least in the one direction for the rider, and
the threshold in one direction is larger than the threshold in the other direction and the second distance threshold.

6. The airbag device according to claim 3, wherein the predetermined condition includes a fourth condition that, before a movement distance of the rider with respect to the vehicle in one direction in a longitudinal direction of the vehicle in which the rider is positioned with respect to a vehicle support position where the airbag is supported by the vehicle exceeds the distance threshold, at least any one of an acceleration in a lateral direction of the vehicle, an acceleration in an other direction opposite to the one direction, a speed in the lateral direction of the vehicle, and a speed in the other direction opposite to the one direction exceeds a predetermined threshold, and
the separation control unit causes the separation unit to separate the airbag in a case where the first condition and the fourth condition are satisfied.

7. The airbag device according to claim 3, wherein, in a case where at least any one of an inclination angle and an angular velocity of the vehicle satisfies a predetermined condition, the detection unit separates the airbag when the airbag is deployed to a predetermined state, even in a case where the second condition is not established.

8. The airbag device according to claim 3, wherein the airbag is deployed in a case where a collision of the vehicle is detected, and
in a preset high-speed traveling state when the collision is detected, even in a case where the second condition is not established, the separation control unit separates the airbag without delay when the airbag is deployed to a predetermined state.

9. The airbag device according to claim 2, wherein a load detection unit that detects a tension with which the airbag is pulled by movement of the rider is provided,
the predetermined condition further includes a third condition that the tension exceeds a preset tension threshold, and
the separation control unit causes the separation unit to separate the airbag in a case where the first condition and the third condition are satisfied.

10. The airbag device according to claim 1, wherein the detection unit performs arithmetic processing for estimating a movement distance of the rider with respect to the vehicle based on an acceleration of the vehicle,
the predetermined condition further includes a second condition that the movement distance exceeds a preset distance threshold, and the separation control unit causes the separation unit to separate the airbag in a case where at least the first condition and the second condition are satisfied.

11. The airbag device according to claim 10, wherein
the detection unit acquires an acceleration in a longitudinal direction of the vehicle and an acceleration in a lateral direction of the vehicle, estimates a movement distance of the rider in the longitudinal direction of the vehicle with respect to the vehicle based on the acceleration in the longitudinal direction of the vehicle, and estimates a movement distance of the rider in the lateral direction of the vehicle with respect to the vehicle based on the acceleration in the lateral direction of the vehicle,
the distance threshold includes a first distance threshold that is a distance threshold in the longitudinal direction of the vehicle and a second distance threshold that is a distance threshold in the lateral direction of the vehicle, and
it is determined that the second condition is satisfied in a case where any of a case where the movement distance of the rider in the longitudinal direction of the vehicle exceeds the first distance threshold and a case where the movement distance of the rider in the lateral direction of the vehicle exceeds the second distance threshold is satisfied.

12. The airbag device according to claim 11, wherein
the first distance threshold includes a threshold in one direction and a threshold in an other direction in the longitudinal direction of the vehicle in which the rider is positioned with respect to a vehicle support position where the airbag is supported by the vehicle,
a part of the airbag is deployed at least in the one direction for the rider, and
the threshold in one direction is larger than the threshold in the other direction and the second distance threshold.

13. The airbag device according to claim 12, wherein, in a case where at least any one of an inclination angle and an angular velocity of the vehicle satisfies a predetermined condition, the detection unit separates the airbag when the airbag is deployed to a predetermined state, even in a case where the second condition is not established.

14. The airbag device according to claim 12, wherein
the airbag is deployed in a case where a collision of the vehicle is detected, and
in a preset high-speed traveling state when the collision is detected, even in a case where the second condition is not established, the separation control unit separates the airbag without delay when the airbag is deployed to a predetermined state.

15. The airbag device according to claim 11, wherein, in a case where at least any one of an inclination angle and an angular velocity of the vehicle satisfies a predetermined condition, the detection unit separates the airbag when the airbag is deployed to a predetermined state, even in a case where the second condition is not established.

16. The airbag device according to claim 11, wherein
the airbag is deployed in a case where a collision of the vehicle is detected, and
in a preset high-speed traveling state when the collision is detected, even in a case where the second condition is not established, the separation control unit separates the airbag without delay when the airbag is deployed to a predetermined state.

17. The airbag device according to claim 10, wherein
the predetermined condition includes a fourth condition that, before a movement distance of the rider with respect to the vehicle in one direction in a longitudinal direction of the vehicle in which the rider is positioned with respect to a vehicle support position where the airbag is supported by the vehicle exceeds the distance threshold, at least any one of an acceleration in a lateral direction of the vehicle, an acceleration in an other direction opposite to the one direction, a speed in the lateral direction of the vehicle, and a speed in the other direction opposite to the one direction exceeds a predetermined threshold, and
the separation control unit causes the separation unit to separate the airbag in a case where the first condition and the fourth condition are satisfied.

18. The airbag device according to claim 10, wherein, in a case where at least any one of an inclination angle and an angular velocity of the vehicle satisfies a predetermined condition, the detection unit separates the airbag when the airbag is deployed to a predetermined state, even in a case where the second condition is not established.

19. The airbag device according to claim 18, wherein
the airbag is deployed in a case where a collision of the vehicle is detected, and
in a preset high-speed traveling state when the collision is detected, even in a case where the second condition is not established, the separation control unit separates the airbag without delay when the airbag is deployed to a predetermined state.

20. The airbag device according to claim 10, wherein
the airbag is deployed in a case where a collision of the vehicle is detected, and
in a preset high-speed traveling state when the collision is detected, even in a case where the second condition is not established, the separation control unit separates the airbag without delay when the airbag is deployed to a predetermined state.

21. The airbag device according to claim 1, wherein
a load detection unit that detects a tension with which the airbag is pulled by movement of the rider is provided,
the predetermined condition further includes a third condition that the tension exceeds a preset tension threshold, and
the separation control unit causes the separation unit to separate the airbag in a case where the first condition and the third condition are satisfied.

* * * * *